United States Patent [19]

Lussier et al.

[11] 3,929,621

[45] Dec. 30, 1975

[54] COPPER CONTAINING HYDROCARBON CRACKING CATALYST

[75] Inventors: Roger J. Lussier, Ellicott City; John Storey Magee, Jr., Cooksville; Edwin Wolf Albers, Annapolis, all of Md.

[73] Assignee: W. R. Grace & Co., New York, N.Y.

[22] Filed: Oct. 24, 1974

[21] Appl. No.: 517,559

Related U.S. Application Data

[62] Division of Ser. No. 363,374, May 24, 1973, abandoned.

[52] U.S. Cl. .............................. 208/120; 252/455 Z
[51] Int. Cl.² .................. C10G 11/04; B01J 29/12
[58] Field of Search ................................. 208/120

[56] References Cited
UNITED STATES PATENTS 3,804,747  4/1974  Kimberlin et al. .................. 208/120
3,835,032  9/1974  Dolbear et al. ..................... 208/120

*Primary Examiner*—Delbert E. Gantz
*Assistant Examiner*—G. E. Schmitkons
*Attorney, Agent, or Firm*—Joseph P. Nigon

[57] ABSTRACT

A copper exchanged zeolite cracking catalyst capable of producing high octane gasoline of increased aromatic and olefinic content. Mixtures of copper and hydrogen ions are exchanged into a Y-type zeolite using a combination of exchange and calcination steps. The exchanged zeolite is advantageously combined with a major portion of inorganic oxide matrix to produce a catalyst suitable for use in standard commercial fluid and moving bed cat-cracking units.

3 Claims, No Drawings

COPPER CONTAINING HYDROCARBON CRACKING CATALYST

This application is a divisional of application Ser. No. 363,374, filed May 24, 1973, and now abandoned.

The present invention relates to hydrocarbon cracking catalysts, and more specifically to improved zeolite cracking catalyst compositions which are capable of producing a high yield of aromatic and olefinic gasoline fractions of enhanced octane rating.

It is generally known that hydrocarbon cracking catalysts which are promoted with stabilized zeolites, particularly ion exchanged synthetic faujasite (type X and Y zeolite), are capable of producing high yields of gasoline fractions from petroleum feedstocks such as gas oil. These cracked gasoline fractions are subsequently combined with octane enhancing additives such as tetraethyl lead to produce high octane motor fuel.

Recent emphasis on air pollution control has dictated a need for removing metal type octane enhancing additives from commercial gasolines. To produce non-leaded gasoline of sufficient octane rating for use in modern automobile engines it is generally necessary for the refiner to use a blend of petroleum gasoline fractions which are of inherently high octane rating. Highly aromatic and olefinic gasoline fractions are of particular use to the refiner. Unfortunately, however, gasoline fractions produced by the cat-cracking of gas oil using crystalline zeolite type cracking catalysts are of relatively low aromatic and olefinic content. Accordingly, relatively expensive subsequent catalytic treatment is generally required to increase the aromatic and olefinic content, and hence the octane rating of cat-crack gasolines, and thereby avoid the addition of lead type octane enhancing additives.

It is therefore an object of the present invention to provide cat-cracked gasoline fractions which possess an increased aromatic and olefin content.

It is another object to provide an improved catalytic cracking catalyst composition which is capable of producing a high yield of gasoline fractions which exhibit increased octane rating without the addition of octane enhancing additives.

It is still another object to provide a highly active metal exchanged zeolite catalyst which is capable of cracking petroleum hydrocarbon feedstocks to produce highly aromatic and olefinic type gasoline fractions.

It is yet another object to provide a metal exchanged synthetic faujasite containing fluid cat-cracking catalyst which is suitable for use in commercial cracking units and which is capable of producing gasoline of inherently higher octane rating than normally obtained using zeolite promoted cat-cracking catalysts.

It is yet a further object to provide a metal exchanged faujasite cat-cracking catalyst which will produce high yields of aromatic and olefinic gasoline without producing attendant excessive quantities of undesirable coke and dry gas fractions.

These and still further objects of the present invention will become readily apparent to one skilled in the art from the following detailed description and specific examples.

Broadly, our invention contemplates a zeolite cracking catalyst which comprises Y-type zeolite exchanged with a combination of copper and hydrogen ions.

More specifically, we have made the surprising finding that a Y-type zeolite having a silica to alumina ratio in excess of about 3.0 which has been ion exchanged from about 1 to 10% by weight copper ions expressed as CuO in combination with hydrogen ions will catalyze the cracking of petroleum to produce gasoline fractions of unusually high aromatic and olefin content. Even more surprising, is our finding that the present copper hydrogen exchanged type Y zeolite (Cu-H-Y) contemplated herein, when used as a hydrocarbon cracking catalyst or catalyst additive, will produce only minor amounts of undesirable coke and/or dry gas fractions.

To produce the copper-hydrogen exchanged type Y zeolite, i.e., Cu—H—Y contemplated herein, the following procedure is used:

1. A sodium type Y zeolite is exchanged with an ammonium salt solution, such as aqueous ammonium sulfate, to obtain a zeolite which contains less than about 4% and preferably about 3% by weight $Na_2O$.

2. The ammonium exchanged zeolite is then heated (calcined) at about 800°–1400°F for 1 to 3 hours.

3. The calcined zeolite is again exchanged with ammonium ions to lower the $Na_2O$ content of the zeolite to below about 0.5% by weight.

4. The zeolite is then contacted with a solution of copper ions, preferably aqueous copper chloride, to obtain a zeolite which contains about 1–10% by weight CuO.

5. The copper exchanged zeolite is calcined at a temperature of 500° to 1400°F for a period of 1 to 5 hours.

Optionally, the zeolites prepared above may be reduced in hydrogen atmosphere at a temperature of about 400° to 1200°F for ½ to 10 hours prior to use.

The catalysts contemplated in the present invention may comprise either essentially 100% Cu—H—Y, or the Cu—H—Y may be admixed with an inorganic oxide component. Where it is desired to obtain a catalyst in particle form, the precursor synthetic sodium Y zeolite ingredient may be in the form of a formed fluidizable or pelleted particle. This fluidizable or pelleted particle is subjected to the above exchange and calcination procedures to obtain a catalyst product which is essentially all Cu—H—Y.

When it is desired to obtain a catalyst which contains Cu—H—Y admixed with an inorganic oxide matrix, the Cu—H—Y in finely divided form is blended with a suitable inorganic oxide matrix component. Suitable matrix components are generally described in the prior art, and may be selected from inorganic hydrogels such as silica, alumina and silica-alumina hydrogel. In general, these hydrogel components are essentially amorphous and are readily blended with the highly crystalline Cu—H—Y component. It is also contemplated that matrix components such as clay and combinations of clay with amorphous inorganic hydrogels may be combined with the presently contemplated Cu—H—Y catalyst component.

As indicated above, the catalysts contemplated herein may be obtained in fluid form wherein finely divided spray dried microspheres having a particle size range of from about 10 to 150 microns are obtained using conventional catalyst preparation techniques. It is also contemplated that catalysts suitable for moving or fix bed operation wherein the catalyst particle size ranging from about 5 to 40 mesh may also be obtained using standard catalyst preparation procedures.

The present catalysts are used in the cat-cracking of heavy petroleum feedstocks. Preferably the catalysts are utilized in a conventional manner wherein the petroleum feedstock such as gas oil is contacted with a bed of the catalyst at a temperature of from about 800° to 1000°F. The contact time of the petroleum feedstock with the catalyst will depend upon the specific catalytic process employed; however, it is found that contact times as low as 5 seconds up to 300 seconds may be advantageously employed using the highly active catalyst of the present invention.

When the present catalyst is used in combination with a typical semi-synthetic matrix, i.e., a matrix comprising silica-alumina hydrogel and clay, wherein the Cu—H—Y component is present in amounts ranging from about 5 to 50% by weight, the catalyst will exhibit a microactivity on the order of from about 60 to 85 when tested under standard conditions. The product distribution obtained using the present catalyst reveals that high yields of gasoline fractions ($C_4$ through $C_9$) are obtained. These gasoline fractions possess an extraordinarily high aromatic content which is readily measured using standard NMR techniques. It is also found that the catalysts product exceptionally high yields of $C_4$ olefins and branch chain $C_4$ isomers. The present catalysts produce a cracked product which contains only small quantities of undesirable dry gas (hydrogen, $C_1$ and $C_2$) products and only small amounts of coke. This result is entirely unexpected in that it is generally found that the addition of metals such as copper to ordinary catalysts generally increases the dry gas and coke production levels to levels which are not acceptable in commercial cracking processes.

Having set forth the basic aspects of the present invention, the following examples are given to illustrate specific embodiments thereof.

EXAMPLE I

Preparation of Cu—H—Y

A 300 g sample of NaY having a $SiO_2/Al_2O_3$ ratio of 5.4 was mixed with a solution which contained 150 g of $(NH_4)_2SO_4$ and 11 ml concentrated $H_2SO_4$ dissolved in 1200 ml of $H_2O$ and heated to boiling for 1 hour. This treatment was repeated twice more. Then the zeolite was recovered and washed sulfate free with $H_2O$. The zeolite was then calcined for 3 hours at 1430°F. The calcined zeolite was then exchanged twice with a solution which contained 300 g $(NH_4)_2SO_4$ dissolved in 3 l $H_2O$. The zeolite was recovered and a 20 g sample was mixed with a solution which contained 1.08 g $CuCl_2$·$2H_2O$ dissolved in 200 ml $H_2O$ and heated at boiling for ½ hour. The copper exchanged zeolite was then calcined at 1500°F for 3 hours. The resultant Cu—H—Y zeolite contained 2.3 wt. % CuO.

EXAMPLE II

Preparation of Catalysts

A. Various amounts of Cu—H—Y zeolites prepared by procedures set forth in Example I were slurried in 200 ml $H_2O$. The zeolite slurries were then mixed with various amounts of a finely divided semi-synthetic cracking catalyst base composition which comprised 30% kaolin clay and 70% amorphous silica-alumina hydrogel mixed in 150 ml water. The composition was dried, pilled, and steam deactivated by treatment with 15 psig at 1350°F for 8 hours.

B. The above procedure was repeated. However, various amounts of RE—Y zeolite were used which were prepared by the procedure set forth in Example I using rare-earth chloride solution which contained 24 g of mixed rare-earth chloride dissolved in 1.2 l of water in lieu of the copper ion solution. This RE—Y zeolite is used as a blank to compare the selectivity characteristic of the present Cu containing zeolites with a typical prior art RE exchange zeolite.

EXAMPLE III

Various catalyst samples prepared by the methods set forth in Example II above, which contained Cu—H—Y having various metal ion contents, were tested for hydrocarbon cracking activity. The cracked hydrocarbon products resulting from the test (syncrude) were analyzed by gas chromatography for the major olefin fraction of the $C_6$ product and by Nuclear Magnetic Resonance for aromatic protons using the procedure set forth in U.S. Pat. No. 3,693,071 to Dolbear. The cracking activity test was conducted at 920°F using West Texas Gas Oil, a weight hourly space velocity (WHSV) of 16 and a catalyst to oil ratio of 5.8. The results are set forth in the Table below.

TABLE

| Catalyst (Sample) | Promoter (wt. % Zeolite) | Description wt. % CuO-$RE_2O_3$ in Zeolite | | Activity (Vol. % Conversion) | Olefin (wt. %) | Aromatic Hydrogen (% Aromatic Protons) |
|---|---|---|---|---|---|---|
| 1 | 20 Cu-H-Y | 2.0 | — 0 | 77.1 | 22.8 | 16.9 |
| 2 | 20 Cu-H-Y | 4.0 | — 0 | 69.0 | 25.5 | 14.0 |
| 3 | 20 Cu-H-Y | 2.0 | — 0 | 72.7 | 21.1 | 16.6 |
| 4 | 15 RE-Y | 0 | — 17 | 71.5 | 13.9 | 12.8 |

The above data conclusively shows that cracking catalysts of the present invention (Samples 1, 2 and 3), which contain copper are highly active and capable of producing considerably greater quantities of both olefins and aromatics than a typical non-copper containing prior art catalyst (Sample 4). In view of the fact the octane number of gasoline is generally proportional to olefins and aromatic content, the presently disclosed cracking catalyst composition provides a means by which a petroleum refiner can produce a higher octane gasoline directly from his catalytic cracking unit.

We claim:

1. A process for cracking hydrocarbons to obtain substantial yields of gasoline fractions of high aromatic and olefin content consisting essentially of contacting gas oil with a copper and hydrogen ion exchanged Type Y faujasite having a silica to alumina ratio in excess of 3.0, said faujasite having a copper content of 0.5 to 10% by weight as Cu O, at a temperature of 800° to 1000°F. for a period of 1 to 300 seconds.

2. The process according to claim 1 wherein said faujasite is admixed with from about 95 to 50% by weight of an inorganic oxide matrix.

3. The process according to claim 2 wherein said matrix is selected from the group consisting of silica-alumina and silica-alumina hydrogels, clays and mixtures thereof.

* * * * *